April 19, 1949.    L. R. O'NEILL    2,467,629
SPOT WELDING GUN
Filed Oct. 11, 1948
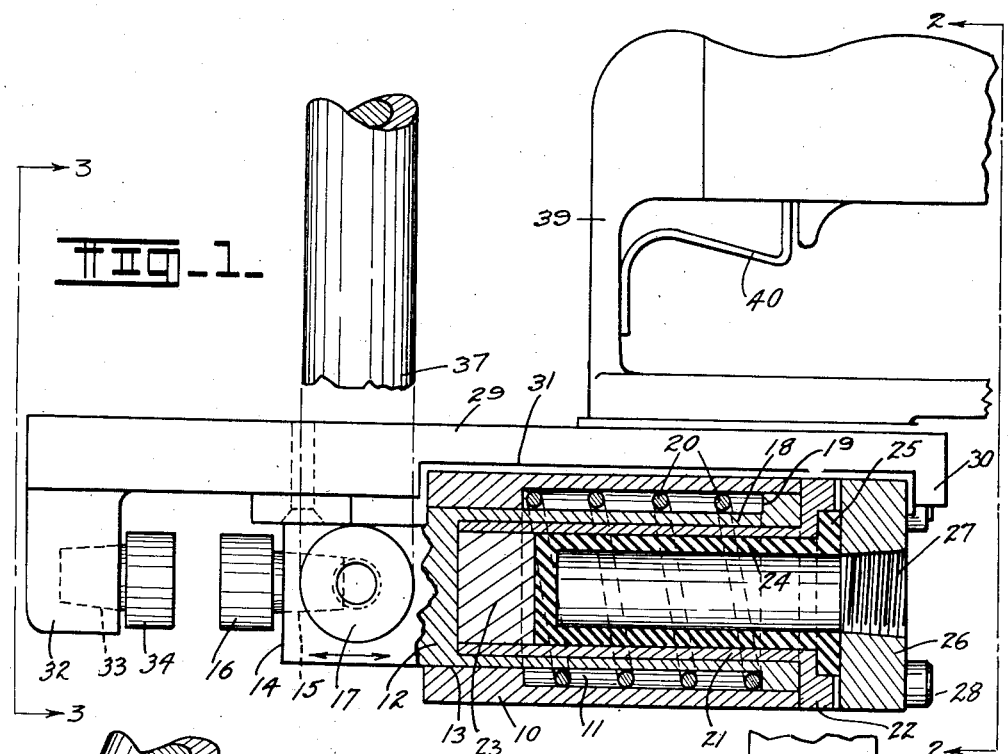
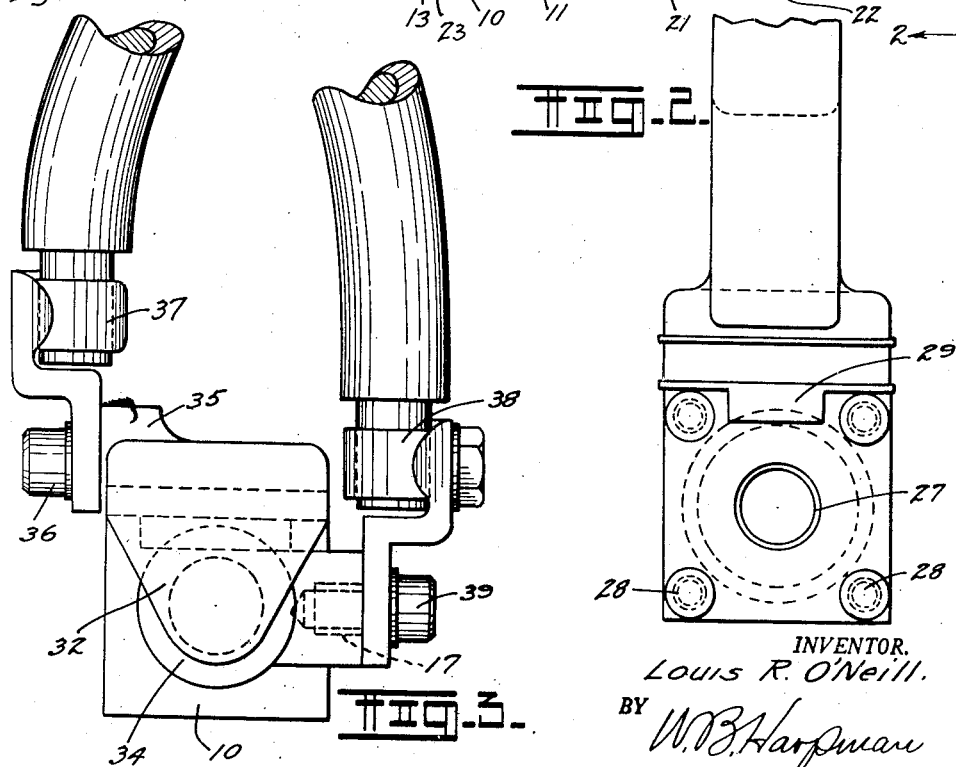
INVENTOR.
Louis R. O'Neill.
BY W. B. Harpman
ATTORNEY.

Patented Apr. 19, 1949

2,467,629

UNITED STATES PATENT OFFICE 2,467,629

SPOT WELDING GUN

Louis R. O'Neill, Warren, Ohio

Application October 11, 1948, Serial No. 53,832

4 Claims. (Cl. 219—4)

This invention relates to welding apparatus and more particularly to portable lightweight electric resistance welding apparatus of the spot welding gun type.

The principal object of the invention is the provision of a lightweight portable spot welding gun.

A further object of the invention is the provision of a spot welding gun which may be simply and easily formed at low cost.

A still further object of the invention is the provision of a spot welding gun of the type wherein fluid pressure is employed for imparting forging pressure to the electrodes during a spot welding operation.

A still further object of the invention is the provision of a spot welding gun wherein leakproof and rupture-proof means are employed for converting fluid pressure introduced into the gun into mechanical pressure applied to the electrodes thereof.

The spot welding gun shown and described herein comprises primarily a telescopically engaged assembly of relatively simple parts enclosing an expansible sack into which suitable hydraulic pressure may be introduced for moving the parts of the gun with respect to one another. The formation of the welding gun is such that one of the electrode carrying arms thereof may be readily removed and another arm of different configuration substituted therefor to simply and easily adapt the welding gun for operation on various workpieces to be joined.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation with parts broken away and parts in cross section.

Figure 2 is an end elevation of the welding gun taken on line 2—2 of Figure 1.

Figure 3 is an end elevation of the welding gun taken on line 3—3 of Figure 1.

By referring to the drawings and Figure 1 in particular it will be seen that a spot welding gun of a compact lightweight portable nature has been disclosed and that it comprises a body member 10 formed of suitable material such as stainless steel drilled longitudinally thereof to form a chamber 11. A piston 12 formed of suitable material such as bronze is slidably disposed in the chamber 11 and particularly with respect to an area of reduced diameter forming an annular shoulder 13 in one end of the body member 10. The piston 12 comprises a head portion 14 having a socket 15 formed therein for the reception of an electrode 16 and a secondary socket 17 for the reception of a current conducting fitting as best shown in Figure 3 of the drawings. The remainder of the piston 12 comprises a tubular extension 18 which normally lies completely within the chamber 11 heretofore referred to and the outer end of which tubular extension 18 has an area of enlarged diameter forming a shoulder 19.

A coil spring 20 is disposed between the inner face of the shoulder 19 and the inner face of the annular shoulder 13, the coil spring 20 normally biasing the piston 12 inwardly with respect to the body member 10. A sleeve member 21 having an enlarged annular shoulder 22 formed on one end thereof is positioned within the tubular extension 18 of the piston 12, it being observed that the annular shoulder 22 thereof engages one end of the body member 10 as it overlies the same. The tubular extension 18 of the piston 12 is therefore slidably positioned with respect to the outermost surface of the sleeve member 21 and a block 23 is slidably positioned in one end of the sleeve member 21 and against the head portion 14 of the piston 12.

An expansible sack 24 formed of suitable material such as "neoprene" is positioned within the sleeve member 21, it being observed that the open end of the expansible sack 24 is provided with an annular flange 25 which is vulcanized or otherwise secured in a fluidtight manner to the inner face of an end plate 26. The end plate 26 has a centrally located orifice 27 which is drilled and tapped for the reception of a fitting (not shown) through which suitable hydraulic pressure may be introduced into the expansible sack 24, a plurality or radially spaced openings are formed in the end plate 26, the annular shoulder 22 of the sleeve member 21 and in registry with a plurality of drilled and tapped openings formed in the body member 10 so that the end plate 26 and the sleeve member 21 may be secured to the body member 10 in the assembly by means of a plurality of bolts 28 as best illustrated in Figure 1 of the drawings.

An electrode carrying arm 29 is positioned on the body member 10 and secured thereto by suitable means, it being observed that an end portion 30 of the arm 29 extends over a portion of the end plate 26 and that the body member 10 and the end plate 26 register, in effect, in a recess 31 formed in the electrode carrying arm 29.

As shown in Figure 1 of the drawings the extension of the arm 29 is straight with respect to the portion thereof secured to the body member 10 and has an offset bracket 32 on its outermost end which in turn has a socket 33 formed therein for the reception of an electrode 34 which is in opposed relation to the electrode 16 heretofore referred to.

It will be obvious to those skilled in the art that an electrode carrying arm of different configuration may be substituted for the arm 29 such as, for example, either a U-shaped or yoke-shaped extension is employed to permit the electrodes 34 and 16 to be engaged upon workpieces inwardly from the edges thereof. The arm 29 has a box 35 formed thereon which in turn is provided with a drilled and tapped opening for the reception of a fitting 36 by means of which an electrical conductor 37 may be effectively connected therewith.

The electric circuit is completed through the welding gun through the connection of a suitable electrical conductor 38 engaging a fitting 39 in registry with the secondary socket 17 heretofore referred to. Welding current is supplied the gun through the conductors 37 and 38 and controlled by a remotely situated device as known in the art (not shown). A handle 39 is secured to the electrode carrying arm 29 where it overlies the body member 10 and includes a trigger 40 for the remote control of suitable devices (not shown) by means of which suitable hydraulic pressures may be established in the welding gun and more particularly in the expansible sack 24 thereof.

It will thus be seen that in operation the actuation of the trigger 40 will cause hydraulic pressure to be introduced into the expansible sack 24 which in turn will expand lengthwise moving the block 23 and the piston 12 outwardly with respect to the body member 10. The electrode 16 will thus be moved into proximity with the electrode 34 and suitably engage workpieces (not shown) positioned therebetween. It will be observed that when the block 23 is moved against the piston 12 by the expanding action of the sack 24, it will move outwardly with respect to the sleeve member 21 thereby providing a continuously unbroken surface against which the expansible sack 24 is engaged. This action will be seen to insure against the accidental damaging of the expansible sack 24 and to insure the concentration of its expanding action directly against the bottom 23 and the piston 12.

It will thus been seen that a simple and efficient lightweight portable electric resistance spot welding gun has been disclosed which meets the several objects of the invention.

Having thus described my invention, what I claim is:

1. An electric spot welding gun of the type in which the welding gun serves as means for applying pressure to the parts to be welded and including a normally fixed electrode and a normally movable electrode, means for moving and applying welding pressure through said movable electrode, and comprising a telescopically engaged piston and cylinder assembly having a fluid pressure distensible element enclosed therein and means for introducing fluid pressure into the said element, the said telescopically engaged piston and cylinder assembly having a sleeve secured to the said cylinder and normally positioned within the said piston and the said distensible element located within the said sleeve.

2. An electric spot welding gun of the type in which the welding gun serves as means for applying pressure to the parts to be welded and including a normally fixed electrode and a normally movable electrode, means for moving and applying welding pressure through said movable electrode, and comprising a telescopically engaged piston and cylinder assembly having a fluid pressure distensible element enclosed therein and means for introducing fluid pressure into the said element, the cylinder of the said piston and cylinder assembly comprising a pair of spaced cylindrical members one within the other and spaced therefrom, the said piston being slidably positioned between the said cylindrical members and the said distensible element being located within the innermost one of the said spaced cylindrical members.

3. An electric spot welding gun of the type in which the welding gun serves as means for applying pressure to the parts to be welded and including a normally fixed electrode and a normally movable electrode, means for moving and applying welding pressure through said movable electrode, and comprising a telescopically engaged piston and cylinder assembly having a fluid pressure distensible element enclosed therein and means for introducing fluid pressure into the said element, the said telescopically engaged piston and cylinder assembly having a sleeve secured to the said cylinder and normally positioned within the said piston and the said distensible element located within the said sleeve, and a block disposed within the said sleeve and between the said distensible element and the said piston.

4. An electric spot welding gun of the type in which the welding gun serves as means for applying pressure to the parts to be welded and including a normally fixed electrode and a normally movable electrode, means for moving and applying welding pressure through said movable electrode, and comprising a telescopically engaged piston and cylinder assembly having a fluid pressure distensible element enclosed therein and means for introducing fluid pressure into the said element, the cylinder of the said piston and cylinder assembly comprising a pair of spaced cylindrical members one within the other and spaced therefrom, the said piston being slidably positioned between the said cylindrical members and the said distensible element being located within the innermost one of the said spaced cylindrical members, and a block disposed within the innermost one of the said cylindrical members and between the said distensible element and the said piston.

LOUIS R. O'NEILL.

REFERENCES CITED

The following references are of record in the file of this patent:

UNITED STATES PATENTS

| Number | Name | Date |
| --- | --- | --- |
| 2,293,338 | Harris | Aug. 18, 1942 |